(12) United States Patent
Ikenoue et al.

(10) Patent No.: US 7,715,142 B2
(45) Date of Patent: May 11, 2010

(54) HARD DISK DRIVE CONTROLLER, IMAGE FORMING APPARATUS AND STORAGE MEDIUM WITH RECORDED COMPUTER PROGRAM

(75) Inventors: Shohei Ikenoue, Saitama (JP); Jun Sato, Saitama (JP); Kentaro Fukami, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/102,369

(22) Filed: Apr. 14, 2008

(65) Prior Publication Data
US 2009/0067083 A1 Mar. 12, 2009

(30) Foreign Application Priority Data
Sep. 11, 2007 (JP) .............................. 2007-235728

(51) Int. Cl.
*G11B 19/02* (2006.01)
(52) U.S. Cl. ...................................................... 360/69
(58) Field of Classification Search .................. 360/69, 360/55, 77.04, 75
See application file for complete search history.

(56) References Cited

U.S. PATENT DOCUMENTS

| | | | | |
|---|---|---|---|---|
| 5,386,553 | A * | 1/1995 | Fujita | 707/205 |
| 5,642,458 | A | 6/1997 | Fukushima et al. | |
| 5,848,034 | A * | 12/1998 | Morioka et al. | 369/30.89 |
| 6,325,636 | B1 * | 12/2001 | Hipp et al. | 439/61 |
| 6,411,506 | B1 * | 6/2002 | Hipp et al. | 361/679.41 |
| 6,735,037 | B1 | 5/2004 | Tanaka et al. | |
| 6,747,878 | B1 * | 6/2004 | Hipp et al. | 361/801 |
| 6,757,748 | B1 * | 6/2004 | Hipp | 710/2 |
| 6,871,300 | B1 * | 3/2005 | Irving | 714/47 |
| 6,934,786 | B2 * | 8/2005 | Irving et al. | 710/300 |
| 6,985,967 | B1 * | 1/2006 | Hipp | 709/250 |
| 7,188,201 | B2 * | 3/2007 | Harima et al. | 710/104 |
| 7,237,129 | B2 * | 6/2007 | Fung | 713/323 |

(Continued)

FOREIGN PATENT DOCUMENTS

JP          05-290493 A     11/1993

(Continued)

OTHER PUBLICATIONS

Japanese Office Action, corresponding to JP Appln. No. 2007-235728, dated Dec. 22, 2009, English-language translation.

*Primary Examiner*—Fred Tzeng
(74) *Attorney, Agent, or Firm*—Sughrue Mion, PLLC

(57) ABSTRACT

A hard disk drive controller including a determining unit that determines an external dimension of a hard disk drive that is provided with a motor for rotating a hard disk and a head that is retractable from the hard disk; and a changing unit that changes control of the hard disk drive device according to the external dimension that has been determined by the determining unit. An image forming apparatus is also disclosed which includes the determining unit, the changing unit, and an energy saving shifting unit that shifts the image forming apparatus into an energy saving mode in certain conditions which have been determined in advance. A storage medium on which a program for execution on a computer is stored, the program having the function of the determining unit and the function of the changing unit, is also disclosed.

9 Claims, 13 Drawing Sheets

U.S. PATENT DOCUMENTS

| | | | |
|---|---|---|---|
| 7,302,506 B2 * | 11/2007 | Harima et al. | 710/104 |
| 7,321,721 B2 * | 1/2008 | Kuno et al. | 386/125 |
| 7,333,283 B2 * | 2/2008 | Akamatsu et al. | 360/69 |
| 7,372,658 B2 * | 5/2008 | Takaishi | 360/77.04 |
| 2002/0004915 A1 * | 1/2002 | Fung | 713/320 |
| 2005/0262392 A1 * | 11/2005 | Irving | 714/11 |
| 2007/0074077 A1 * | 3/2007 | Markow et al. | 714/36 |
| 2007/0101173 A1 * | 5/2007 | Fung | 713/300 |
| 2007/0139020 A1 * | 6/2007 | Johnson et al. | 323/207 |
| 2008/0052433 A1 * | 2/2008 | Harima et al. | 710/104 |

FOREIGN PATENT DOCUMENTS

| | | |
|---|---|---|
| JP | 2001-250315 A | 9/2001 |
| JP | 2001-266453 A | 9/2001 |
| JP | 2003-317365 A | 11/2003 |
| JP | 2004-157961 A | 6/2004 |
| JP | 2005-186426 A | 7/2005 |

* cited by examiner

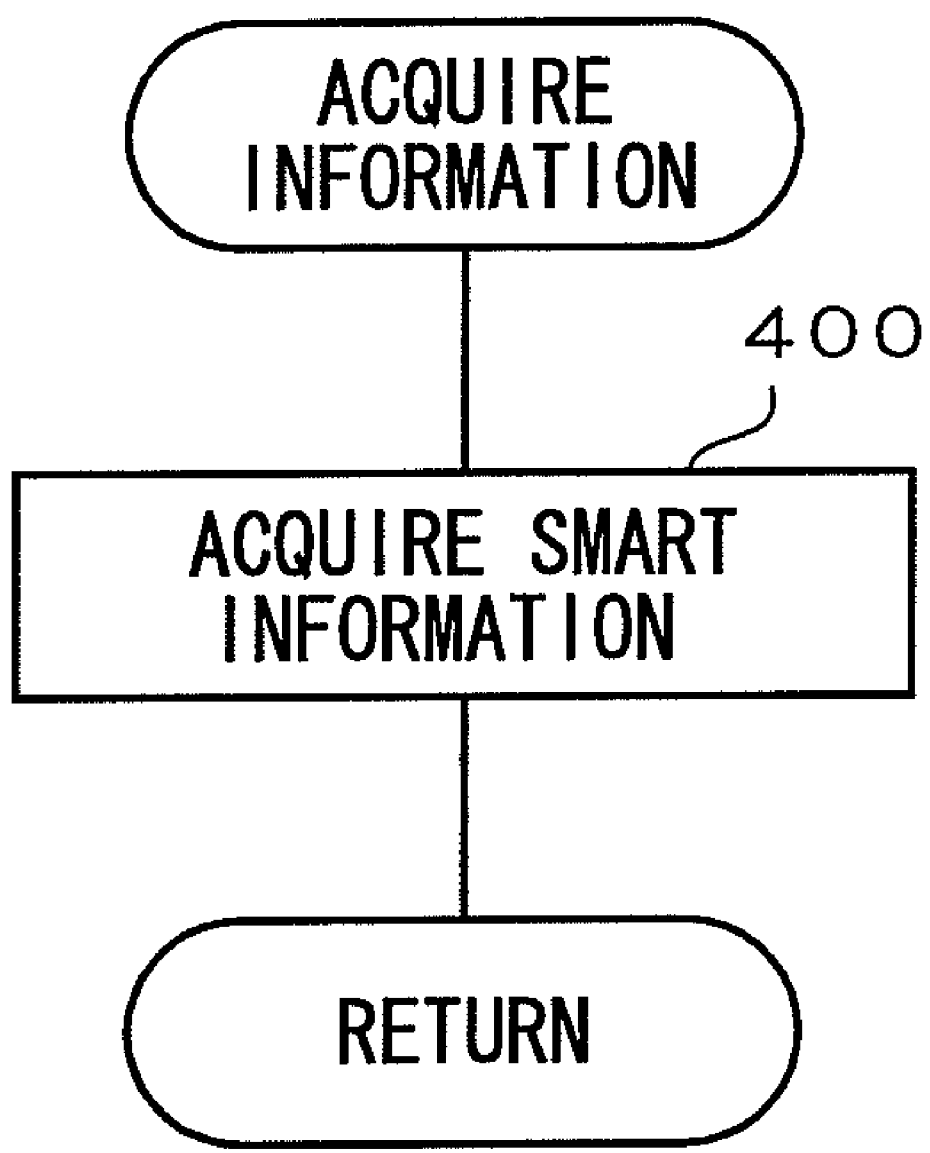

HARD DISK DRIVE CONTROLLER, IMAGE FORMING APPARATUS AND STORAGE MEDIUM WITH RECORDED COMPUTER PROGRAM

CROSS-REFERENCE TO RELATED APPLICATION

This application claims priority under 35 USC 119 from Japanese Patent Application No. 2007-235728 filed Sep. 11, 2007.

BACKGROUND

1. Technical Field

The present invention relates to a hard disk drive controller, an image forming apparatus, and a storage medium on which a computer program has been recorded.

2. Related Art

A technique is proposed for raising the reliability of a hard disk drive (referred to as HDD below) by reducing the duration that a magnetic head resides above a magnetic disk, or by reducing the number of load/unload cycles of a magnetic disk. This is achieved by providing non-volatile memory to the HDD, temporarily accumulating write-data on the non-volatile member, and writing the accumulated data onto the magnetic disk when a read command has been issued and the head is in the loaded state.

3.5 inch HDDs, however, have a high speed of data recording/reproduction and are often installed in applications that require a high operation speed, such as in color printers. 3.5 inch HDDs are also often used in applications which have long periods of continuous operation. There is therefore an expectation that there will be about one occasion per day when there is switching between power supply on/power supply off, and the head is retracted from the disk. Control is therefore preferably carried out so as to reduce switching between the power supply on/power supply off and between motor rotation on/motor rotation off, and to reduce retractions of the head. 3.5 inch HDDs are also often applied in applications to which no energy consumption reducing mechanism has been included and which have a large energy consumption.

2.5 inch HDDs, in contrast, are often installed in systems which prioritize low energy consumption and energy saving. Systems which prioritize energy saving, for example, are systems that reduce energy consumption by frequently ceasing power supply to the HDD when the HDD is not being used. In addition, the HDD itself also enters an energy saving mode when there has been no access to the HDD for a given duration, and reduces energy consumption by, for example, retracting the head and ceasing power supply to a portion of the internal circuit of the HDD, supplying power only to the remaining necessary portion thereof. Since there are frequent cessations of power supply to the 2.5 inch HDDs in this manner, the expected power supply duration in a day is of the order of a few hours, and a state of continuous power supply should be avoided. The rotational duration of the motor is also limited, and continuous rotation of the motor should also be avoided.

However, even within the same type of systems, 2.5 inch HDDs installation is appropriate where, for example, energy saving is prioritized, but 3.5 inch HDDs installation is appropriate when, for example, high volumes of copying are to be performed and printing is to be carried out for long durations. Therefore, the most appropriate HDD differs may depend on the actual application, even within the same type of system.

The speed of data recording and reproduction of 2.5 inch HDDs has recently approached that of old 3.5 inch HDDs, and there are occasions where a 2.5 inch HDD is installed for an application that conventionally was installed with a 3.5 inch HDD. 3.5 inch HDDs are also cheaper than 2.5 inch HDDs due to their differing volumes of production.

Therefore HDDs may be installed with different external dimensions according to the application and the purpose, even within the same system.

SUMMARY

A first aspect of the present invention provides a hard disk drive controller including: a determining unit that determines an external dimension of a hard disk drive that is provided with a motor for rotating a hard disk and a head that is retractable from the hard disk; and a changing unit that changes control of the hard disk drive device according to the external dimension that has been determined by the determining unit.

BRIEF DESCRIPTION OF THE DRAWINGS

Exemplary embodiments of the present invention will be described in detail based on the following figures, wherein:

FIGS. 9A and 9B are flow charts for processing to set control parameters based on S.M.A.R.T information.

DETAILED DESCRIPTION

Figure 1:
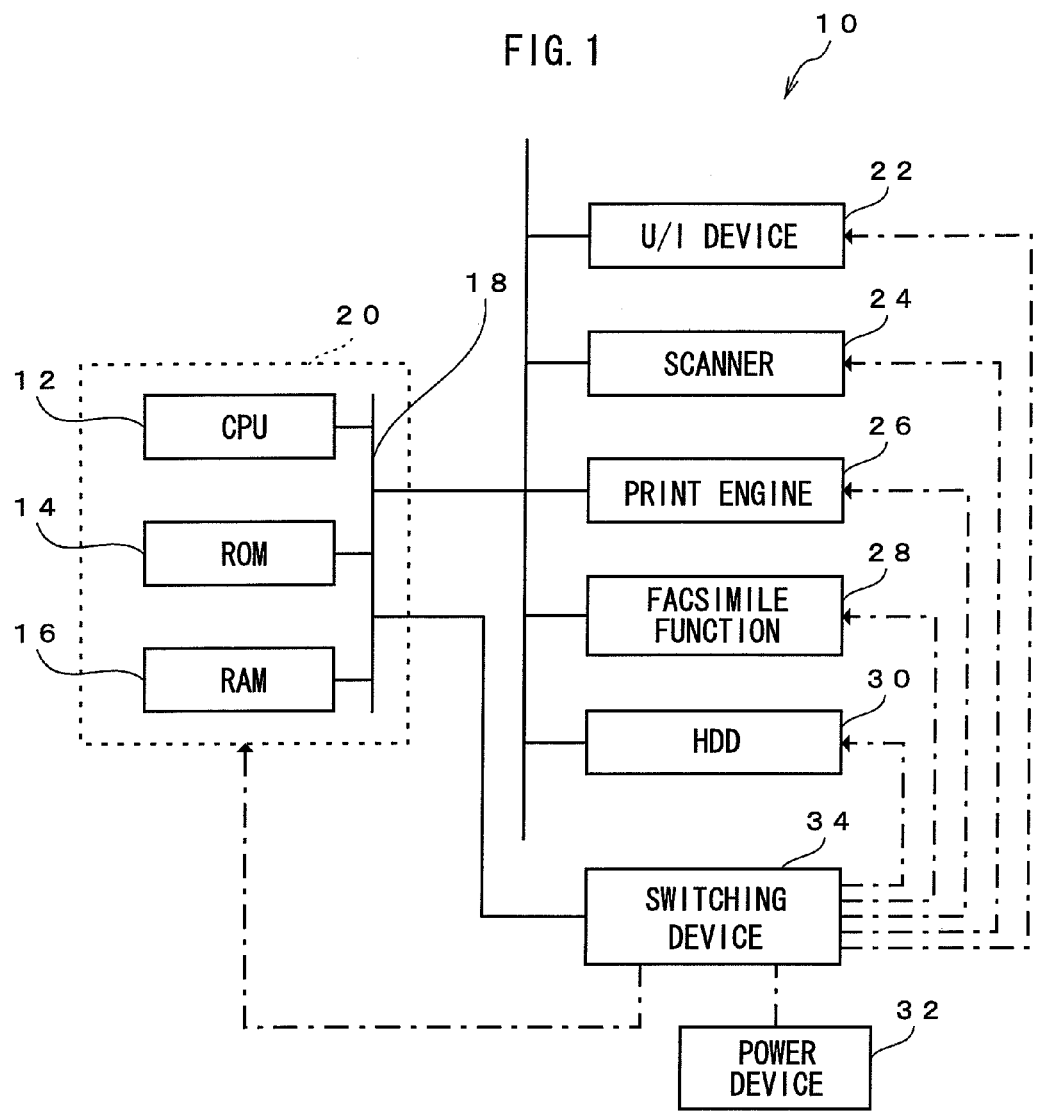
FIG. 1 is an outline configuration diagram of a multi-function machine according to an exemplary embodiment of the present invention.

Explanation will now be given of one example of an exemplary embodiment of the present invention, with reference to the figures. FIG. 1 is a diagram showing an outline configuration of a multi-function machine 10 as an image forming apparatus to which an exemplary embodiment of the present invention is applied.

A system controller 20 is provided in the multi-function machine 10, and the system controller 20 is connected by a BUS 18 to a CPU 12, ROM 14, and a RAM 16 also provided in the multi-function machine 10. The multi-function machine 10 is configured to include the following elements that are connected to the BUS 18 of the system controller 20:

a user interface device (U/I device) 22 that includes an operation panel, into which various operations are input, and a display, which displays the operation state of the multi-function machine 10; a scanner 24; a print engine 26; a facsimile function 28 that receives and transmits data via communications line; and a hard disk drive (HDD) 30. The system controller 20 is network connectable to a computer or the like via a network interface (omitted in the figures).

A document original, for example, is placed on a platen glass (omitted in the figures) of the scanner 24, images on the document original are read in, and image data corresponding to the images of the document original are generated. The print engine 26 uses, for example, an electrophotographic process, and forms an image according to the image data on recording paper or the like. The multi-function machine 10 thereby forms images with the print engine 26, based on image data input via a network from a PC or the like, or image data read in from a document original using the scanner 24.

Data, such as the image data generated by the scanner 24 or the image data input via a network or the like, is written to the HDD 30 under the control of the system controller 20. Data that is written to the HDD 30 is read out under the control of the system controller 20.

The multi-function machine 10 is also connected to a power device 32 and power is supplied from the power device 32 by switching a power switch (omitted in the figures) to on. The system controller 20 is started up by power being supplied thereto, and makes the multi-function machine 10 ready for operation. The power device 32 supplies operating power through a switching device 34 to each of the sections to which power is supplied, as shown by the single dot/single dash lines in FIG. 1, such as the system controller 20, U/I device 22, scanner 24, print engine 26, facsimile function 28, and HDD 30. The switching device 34 is controlled by the system controller 20, and switches between power supply on/power supply off to each of the sections to which power is supplied. The switching device 34 also changes the power supplied to each of the sections to which power is supplied under the control of the system controller 20.

The multi-function machine 10 may be shifted into an energy saving mode that is designed to reduce the power consumption in the sections to which power is supplied, and that reduces the amount of power supply from the power device 32. The system controller 20, for example, monitors each of the sections to which power is supplied, and shifts the multi-function machine 10 into the energy saving mode at timings which have been set in advance, such as when a non-operation state has continued for a predetermined duration or longer. When shifted to the energy saving mode, the system controller 20 generates signals according to the sections to which power is supplied, such as an interruption control signal that interrupts power supply or a reduction control signal that reduces power supply, and outputs these signals to the switching device 34. When the switching device 34 is input with a signal from the system controller 20, such as an interruption control signal or a reduction control signal, the switching device 34 interrupts power supply, reduces power supply, or the like, according to the sections to which power is supplied.

Explanation will now be given of an outline configuration of the HDD 30, with reference to FIG. 2.

The HDD 30 is configured with: a magnetic disk 40 that has a magnetic layer formed on both sides thereof and that is rotated by a rotational drive motor 42; and a magnetic head 44 corresponding to each side of the magnetic disk 40, the magnetic heads 44 each being provided with a reproducing element for reading out information and a recording element for writing information. The magnetic heads 44 are mounted to the leading end of access arms 46, and the access arms 46 are held facing the recording faces of the magnetic disk 40 at positions that are slightly separated (for example, by about 0.1 to 0.2 microns) from the recording faces. The access arms 46 are mounted to the head drive motor 48, and by driving the head drive motor 48 the access arms 46 are caused to swing. Each of the magnetic heads 44 are moved in a radial direction over the respective recording face of the magnetic disk 40 by such swinging of the access arms 46, so that the magnetic heads 44 positioned at predetermined positions over the magnetic disk 40 are able to perform reading out and writing of information along the rotational direction of the magnetic disk 40. Furthermore, when read out or writing of information is not being performed to the magnetic disk 40, each of the magnetic heads 44 may be retracted from their positions over the respective recording faces of the magnetic disk 40 by swinging the access arm 46.

Figure 2:
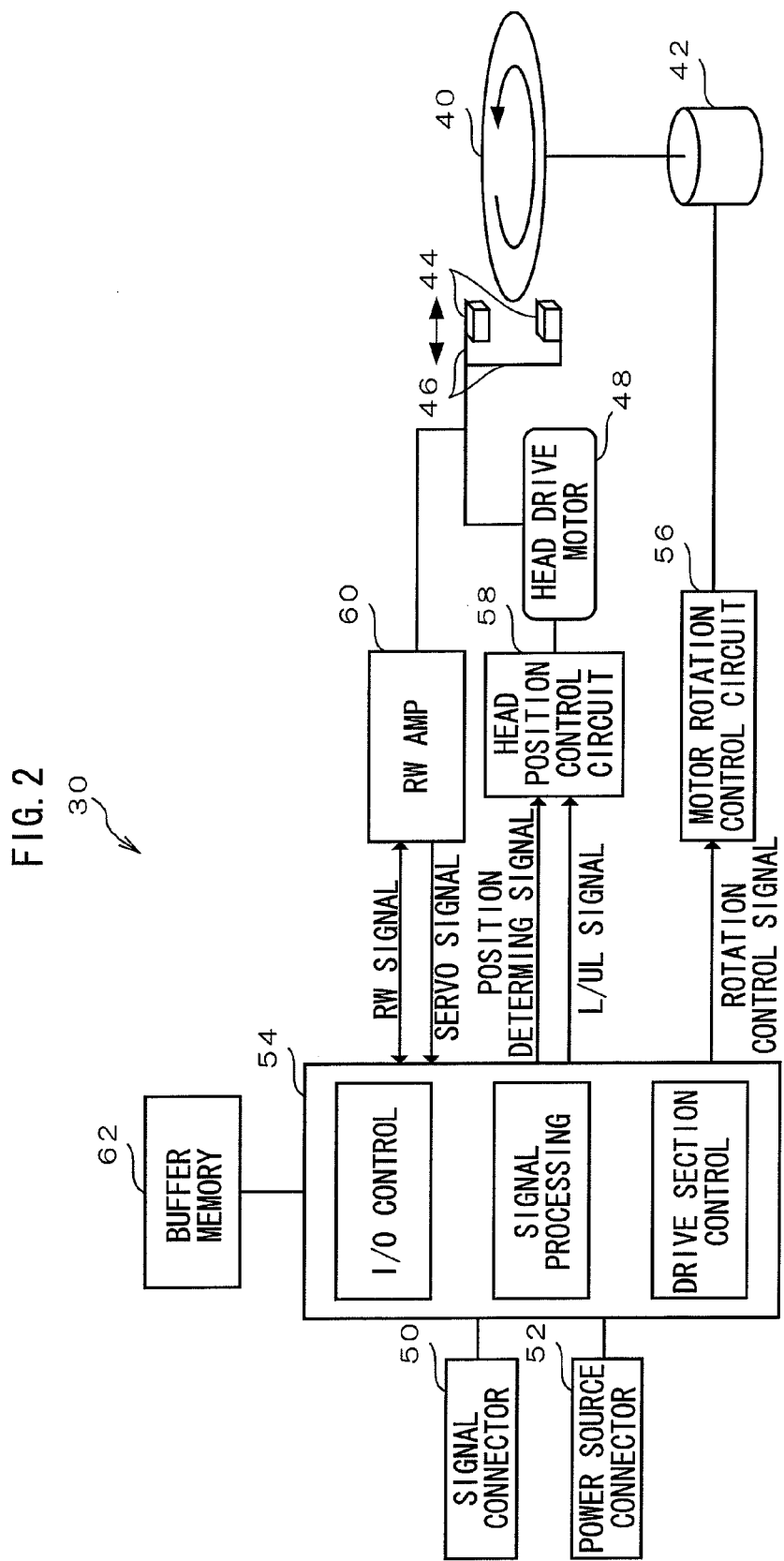
FIG. 2 is an outline configuration diagram of a HDD according to an exemplary embodiment of the present invention.

It should be noted that a single magnetic disk is shown in FIG. 2, however plural magnetic disks may be installed. When plural magnetic disks are installed, each of the magnetic disks may be placed at predetermined intervals from each other so that their axial lines are aligned with each other.

A signal connector 50 is provided to the HDD 30 for inputting data signals. Data signal input to the HDD 30 and data signal output from the HDD 30 is carried out under the control of the system controller 20 via the signal connector 50.

A power source connector 52 is provided for inputting power to the HDD 30. Power supply to the HDD 30 is carried out under the control of the system controller 20 via the power source connector 52.

The signal connector 50 and the power source connector 52 are connected to a hard disk controller (referred to as HDC below) 54. The HDC 54 is configured with a CPU, ROM, and RAM, such that at least the following may be executed: I/O control for controlling input-output of data signals via the signal connector 50; signal processing for conversion of data signals input through the signal connector 50 to data signals output to a Read/Write (RW) amp 60, described later, together with conversion of data signals output from the RW amp 60 to data signals output via the signal connector 50, such as be performing digital-analog conversion; control of the position of the magnetic heads 44; and drive control of the rotation of the rotational drive motor 42.

The HDC 54 is connected to a motor rotation control circuit 56. The HDC 54 outputs a rotation control signal to the motor rotation control circuit 56, and the motor rotation control circuit 56 drives the rotational drive motor 42 according to the rotation control signal. The HDC 54 is connected to a head position control circuit 58. The HDC 54 outputs a position determining signal and a load/unload (L/UL) signal to the head position control circuit 58, and the head drive motor 48 is driven according to the position determining signal and the L/UL signal. The HDC 54 is also connected to the RW amp 60. The HDC 54 outputs read (R) signals and write (W) signals that have been signal processed to the RW amp 60, and the RW amp 60 amplifies the RW signals with a given multiplying factor, and outputs the amplified RW signals to the magnetic heads 44. The RW amp 60 also inputs information that has been read out with the RW signal from the magnetic heads 44 and inputs a servo signal. The HDC 54 generates the position determining signal based on the input servo signal, and outputs the position determining signal to the head position control circuit 58.

The HDD 30 has a buffer memory 62 that uses a read cache and a write cache and is configured from volatile memory.

The buffer memory 62 has a read cache function that temporarily stores information that is frequently reproduced. The buffer memory 62 also has a write cache function that temporarily stores write information in advance of writing to the magnetic disk 40 under a write instruction from the system controller 20, and the information that has been temporarily stored in the buffer memory 62 is stored on the magnetic disk 40. I/O control by the HDC 54 is control for reading or writing information from/to the magnetic disk 40 or the buffer memory 62. It should be noted that it is not necessary to provide a buffer memory 62.

However, the configuration of the HDD depends on the external dimension of the hard disk. Explanation will be given below of 3.5 inch HDDs and 2.5 inch HDDs that are generally installed to multi-function machines. It should be noted that even if there is, for example, an HDD with a 3.0 inch platter, such an HDD may be treated as if it were a 3.5 inch HDD if the external dimension is the same as that of the 3.5 inch HDD standard.

3.5 inch HDDs are often installed to multi-function machines for, for example, carrying out large volume copying, and printing over long durations of time, and such multi-function machines are of a specification that anticipates continuous operation periods of long duration, and anticipates the power to be supplied continuously from switching on the power switch of the multi-function machine to switching off the power switch. Frequently switching between power supply on/power supply off, frequently switching between motor drive on/motor drive off, and frequently switching between magnetic head load/unload, is therefore not anticipated. Therefore, the lifespan of the magnetic head for a standard 3.5 inch HDD is about 50,000 retraction cycles. This means that if there is frequent switching between power supply on/power supply off, motor drive on/motor drive off, and/or magnetic head load/unload, then the reliability of the 3.5 inch HDD decreases, and there is also a negative influence on the lifespan of the HDD. Therefore, it is preferable to suppress switching between power supply on/power supply off, switching between rotating/not rotating the motor, and switching between magnetic head load/unload.

In contrast, 2.5 inch HDDs are often installed to multi-function machines that prioritize energy saving and are of a specification that anticipates power supply to be interrupted when not in operation. It is therefore not anticipated that power will be continuously supplied, that the magnetic disk rotation motor will be continuously driven, nor that the magnetic head will be left hovering above the magnetic disk. The lifespan of a standard 2.5 inch HDD, is therefore from 300,000 to 600,000 times of retraction of the magnetic head. This means that if, for long periods, power is continuously supplied, the magnetic disk motor is rotated, or the magnetic heads are left hovering above the magnetic disk, then the reliability of the 2.5 inch HDD is reduced and there is a negative influence on the lifespan of the HDD. It is therefore preferable, when a 2.5 inch HDD is installed, to control so as to suppress the power supply duration, the motor driving duration and the duration the magnetic heads are hovering.

Since HDDs differ in specification by their external dimensions, it is necessary to change control programs that control HDDs according to the external dimensions of the installed HDD.

However, in the same model of multi-function machine, there are cases where a 2.5 inch HDD has been installed to machines where, for example, energy saving is important, but 3.5 inch HDD have been installed to machines which, for example, carry out large volume copying, or print for long durations.

The data recording/reproducing speed of 2.5 inch HDDs has recently approached that of old 3.5 inch HDDs, and there are occasions where a 2.5 inch HDD is installed in a machine that conventionally was installed with a 3.5 inch HDD.

In this manner, there are occasions where different external dimension HDD are installed in the same multi-function machine. When this happens, it is necessary to change the control program of the HDD according to the HDD external dimension. The multi-function machine 10 of the present invention addresses the above by changing the control contents of the control program according to the external dimension of the HDD.

First Exemplary Embodiment

Figure 3:
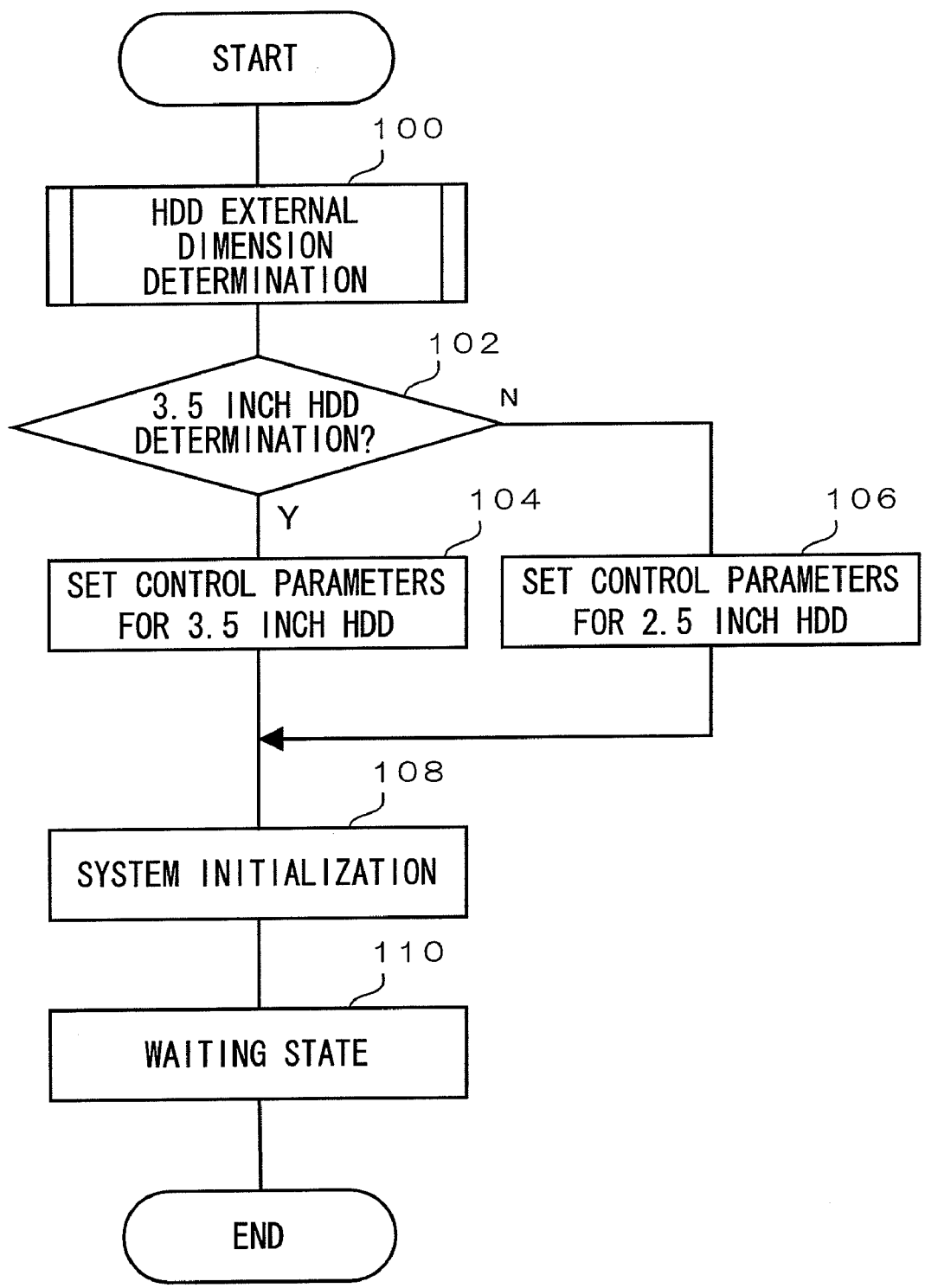
FIG. 3 is a flow chart showing a start-up processing routine in a multi-function machine according to a first exemplary embodiment of the present invention.

The flow chart of FIG. 3 shows a processing routine carried out when the multi-function machine 10 is started up. The program for this processing routine is stored in the ROM 14 of the multi-function machine 10.

When the multi-function machine 10 is started up, steps 100 to 106 are performed before the initialization of the system (step 108) and the waiting state is arrived at (step 110). It should be noted that the steps 100 to 106 may be performed after executing step 108.

The external dimension of the HDD 30 is first determined (step 100), it is determined whether or not it is a 3.5 inch HDD (step 102), when the determination is yes, control parameters for a 3.5 inch HDD are set in the HDD 30 control program (step 104), and when no, control parameters for a 2.5 inch HDD are set in the HDD 30 control program (step 106).

With regard to the control parameters, the control parameters for a 3.5 inch HDD are for controlling such that the number of times are reduced for switching power supply on/power supply off, motor drive on/motor drive off, magnetic head load/unload. For example, by continuing power supply even when shifted into the energy saving mode, the number of times of power supply on/power supply off switching may be reduced, and by preventing stopping of the motor even when shifted into the energy saving mode, the number of times of motor drive on/motor drive off switching may be reduced, and by preventing the heads from being retracted even when shifted into the energy saving mode, the number of times of magnetic head load/unload may be reduced.

The control parameters for a 2.5 inch HDD are control parameters for controlling such that the power supply duration, the motor driving duration, and the duration the magnetic heads are hovering are reduced.

In the multi-function machine 10 according to the present invention, the installed HDD 30 external dimension is determined at start-up, the control parameters of the control program are set according to the determined external dimension, and control is changed of the power supply to the HDD 30, and of the driving of the rotational drive motor 42 and the head drive motor 48 provided in the HDD 30.

The control program for controlling power supply to the HDD 30, the control program for controlling driving of the rotational drive motor 42 provided to the HDD 30, and the control program for controlling driving of the head drive motor 48 provided to the HDD 30 may each be stored in the ROM 14 of the multi-function machine 10, or they may each be stored in the ROM that is included in the HDC 54. Furthermore, each of the controls may be performed in the same control program, or each may be performed in different control programs.

Explanation will now be given of the determining routine for the HDD 30 external dimension at step 100. Three patterns of different methods of determination will be explained, with reference to FIGS. 4 to 6.

Figure 4:
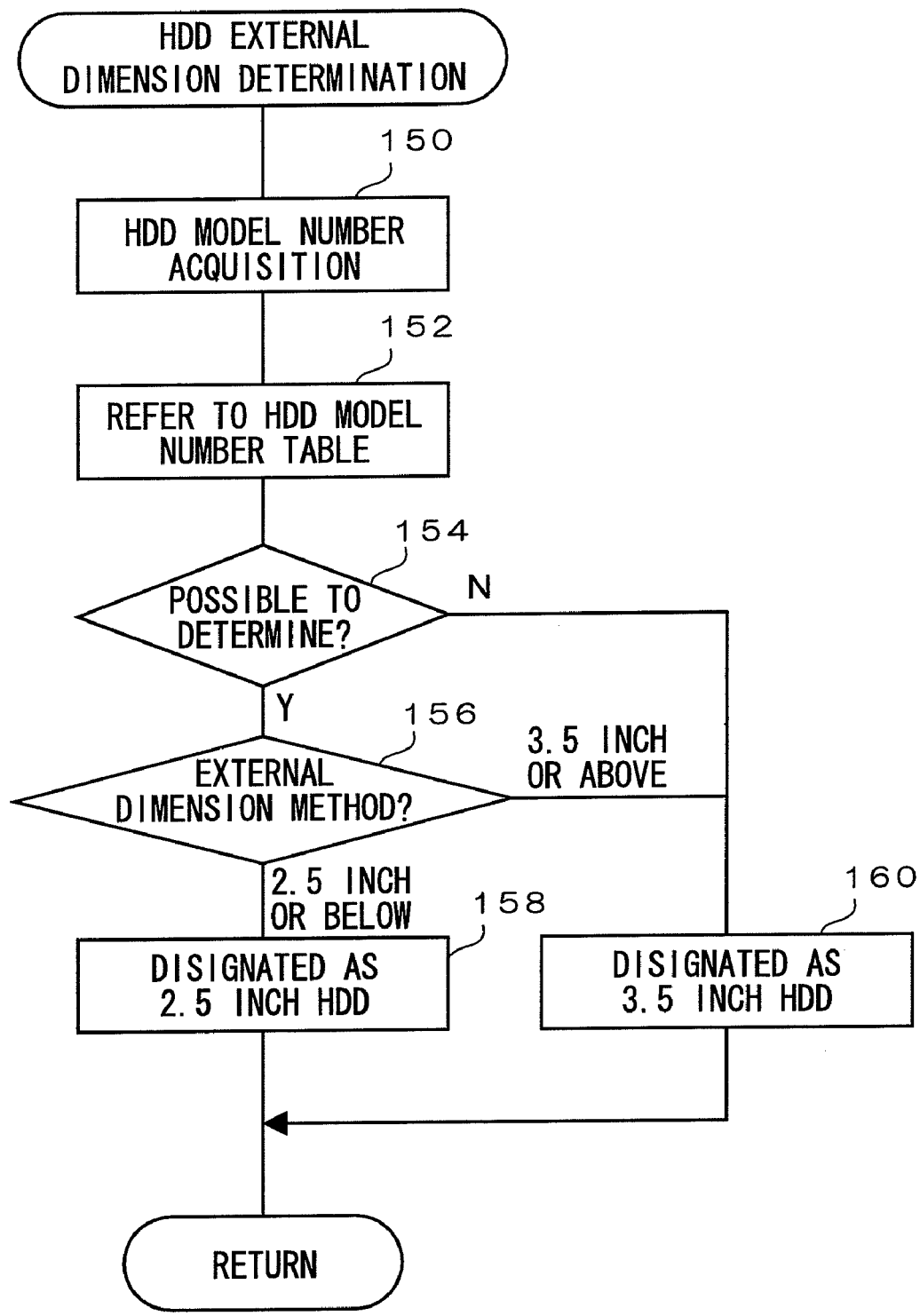
FIG. 4 is a flow chart showing processing for HDD external dimension determination based on the model number of the HDD.

The flow chart in FIG. 4 shows a routine for determining the external dimension based on the model number of the HDD 30.

In step 150, the model number of the HDD 30 is acquired by issuing a command to acquire the model number.

In step 152, a HDD model number table that has been prepared in advance in the multi-function machine 10 is referred to. In the HDD model number table plural HDD model numbers and the external dimension for each of the model numbers are related to each other and stored. It should be noted that the HDD model number table is one that may be updated at a later date, and additional information and the like may be added as required.

In step 154, determination is made as to whether the external dimension of the HDD 30 is capable of being determined, by whether the acquired model number of the HDD 30 is stored in the HDD model number table. If the model number is stored, then routine proceeds to step 156, and when not stored then the routine proceeds to step 160.

At step 156, determination is made as to whether the external dimension of the HDD 30 stored in the HDD model number table, corresponding to the acquired model number of the HDD 30, is 2.5 inches or below, or 3.5 inches or above. If the determination is 2.5 inches or below then the routine proceeds to step 158, and if the determination is 3.5 inches or above, then the routine proceeds to step 160.

At step 158, designation is made that the HDD external dimension of the HDD, which was determined to be 2.5 inches or below, is 2.5 inches. The HDD 30 installed in the multi-function machine 10 is 2.5 inches or 3.5 inches, however, it is conceivable that the external dimension of the installed HDD that is determined to be 2.5 inches or below is actually 1.8 inches, for example. When control that is suitable for a 2.5 inch HDD is applied to such an installed external dimension HDD of 2.5 inches or below, a reduction in the lifespan of the HDD may also be suppressed, and therefore in the present exemplary embodiment all cases that have been determined to be 2.5 inch or below are designated as 2.5 inches.

At step 160, designation is made that the HDD external dimension of the HDD, which was determined to be 3.5 inches or above, is 3.5 inches. When control that is suitable for a 3.5 inch HDD is applied to, for example, an installed HDD with an external dimension of 3.5 inches or above that is, for example, 5.0 inches, a reduction in the lifespan of the HDD may also be suppressed, and therefore in the present exemplary embodiment all cases that have been determined to be 3.5 inches or above are designated as 3.5 inches.

If control that is suitable for a 3.5 inch HDD being applied to an installed 2.5 inch HDD is compared with control that is suitable for a 2.5 inch HDD being applied to an installed 3.5 inch HDD, then the chance that the lifespan of the HDD will be shortened is greater when control that is suitable for a 2.5 inch HDD is applied to an installed 3.5 inch HDD. Therefore, when the model number of the HDD 30 is not stored in the HDD model number table, and the external dimension cannot be determined, then the external dimension of the HDD 30 is designated to be 3.5 inches at step 156.

Figure 5:
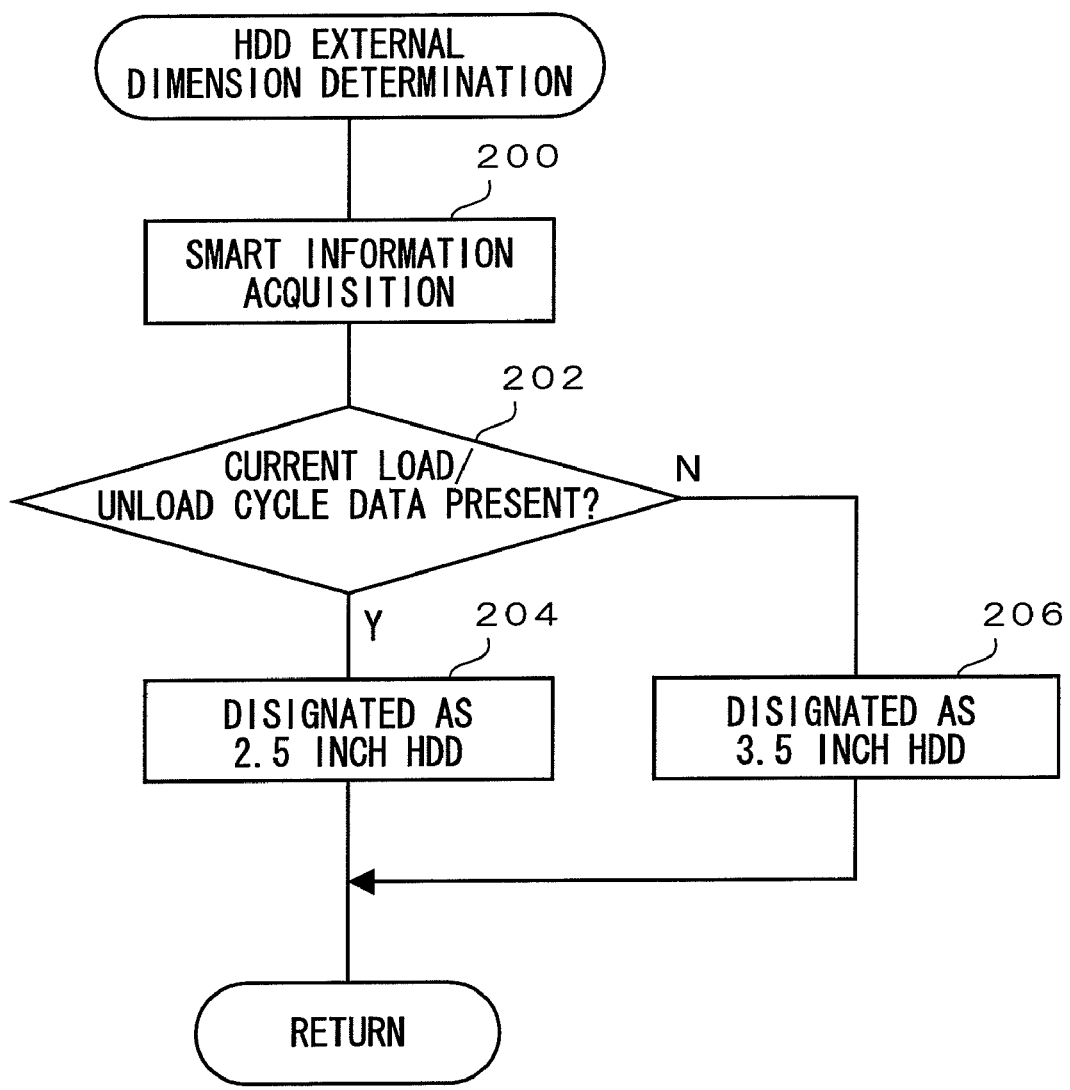
FIG. 5 is a flow chart showing processing for HDD external dimension determination based on S.M.A.R.T information.

The flow chart in FIG. 5 shows a routine for determining the external dimension based on information used for predicting breakdowns and the like, Self-Monitoring Analysis and Reporting Technology (SMART) information.

The SMART information is acquired in step 200 from the HDD 30.

In step 202, determination is made as to whether there is information in the acquired SMART information about the total number of times that the magnetic heads have been retreated to a non-operation position away from the surface of the magnetic disk, and returned thereafter to the surface of the magnetic disk. If there is this information then the routine proceeds to step 204, and if not, then the routine proceeds to step 206.

Designation is made at step 204 that the candidate HDD 30 for designation is a 3.5 inch HDD.

Designation is made at step 206 that the candidate HDD 30 for designation is a 2.5 inch HDD.

Figure 6:
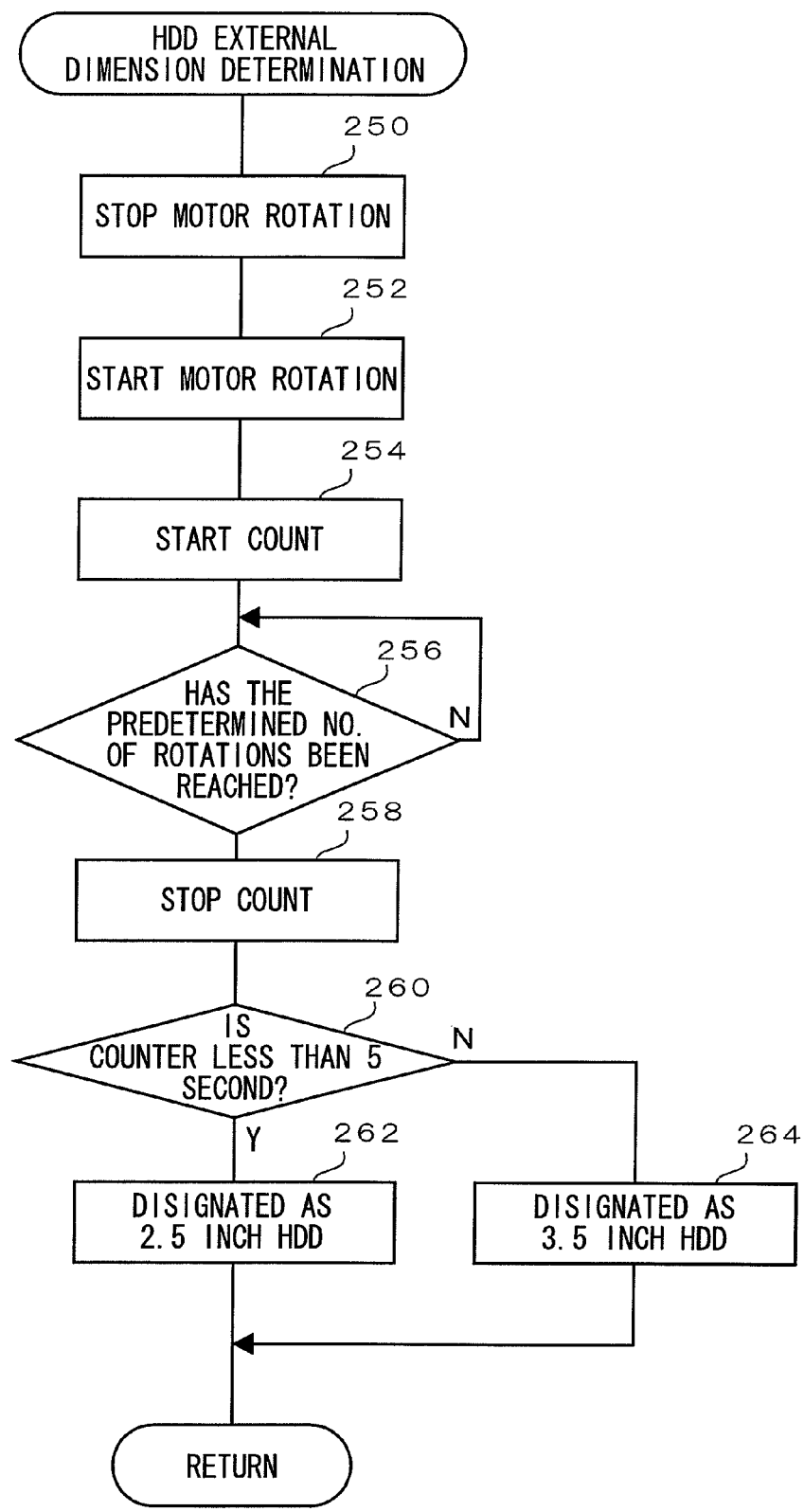
FIG. 6 is a flow chart showing processing for HDD external dimension determination based on the start-up duration of a rotational drive motor.

The flow chart in FIG. 6 shows a routine for determining the external dimension based on the rotation of the rotational drive motor 42.

At step 250 rotation of the rotational drive motor 42 is stopped if the rotational drive motor 42 is rotating.

At step 252 the rotational drive motor 42 is rotated, and a count is started (step 254) with a counter (omitted in the figures) provided to the system controller 20.

At step 256, determination is made as to whether the rotation of the rotational drive motor 42 has reached a predetermined number of rotations. When the predetermined number of rotations has been reached then the routine proceeds to step 258, and when not then determination of step 256 is carried out again.

At step 258, the count of the counter is stopped, and the start-up duration of the rotational drive motor 42 is acquired.

At step 260, determination is made as to whether the start-up duration of the rotational drive motor 42 that has been measured by the counter is less than 5 seconds. The start-up duration of a 2.5 inch HDD rotational drive motor is usually about 3 seconds, and the start-up duration of a 3.5 inch HDD rotational drive motor is usually about 10 seconds. It is based on these figures that the designation of the external dimension is made in the present exemplary embodiment at the 5 second standard time. It should be noted that the 5 second standard time may be altered at a later date.

Designation is made at step 262 that the candidate HDD 30 for designation is a 2.5 inch HDD.

Designation is made at step 264 that the candidate HDD 30 for designation is a 3.5 inch HDD.

The first exemplary embodiment changes control according to the HDD external dimension in this manner, such that: control is carried out to reduce each of the numbers of times of power supply on/power supply off, the number of times of motor driving/not driving and magnetic head load/unload; or control is carried out to reduce each of the power supply duration, the motor driving duration and the duration for which the magnetic heads are hovering.

A case has been described in the present exemplary embodiment of application of the invention to a image forming apparatus, it is obviously the case that the invention could also be applied to, for example, an audio recorder, an audio player or other similar machines installed with a HDD. This also applies to the following exemplary embodiment.

Second Exemplary Embodiment

Explanation will now be given of an image forming apparatus according to a second exemplary embodiment of the present invention.

Explanation was given in the first exemplary embodiment where changing the control of the HDD 30 is by discrimination on the basis of the external dimension of the HDD 30, but explanation will be given in the second exemplary embodiment where there changing control of the HDD 30 occurs without discrimination of the external dimension. Explanation follows of the differences of the second exemplary embodiment from the first exemplary embodiment.

Figure 7:
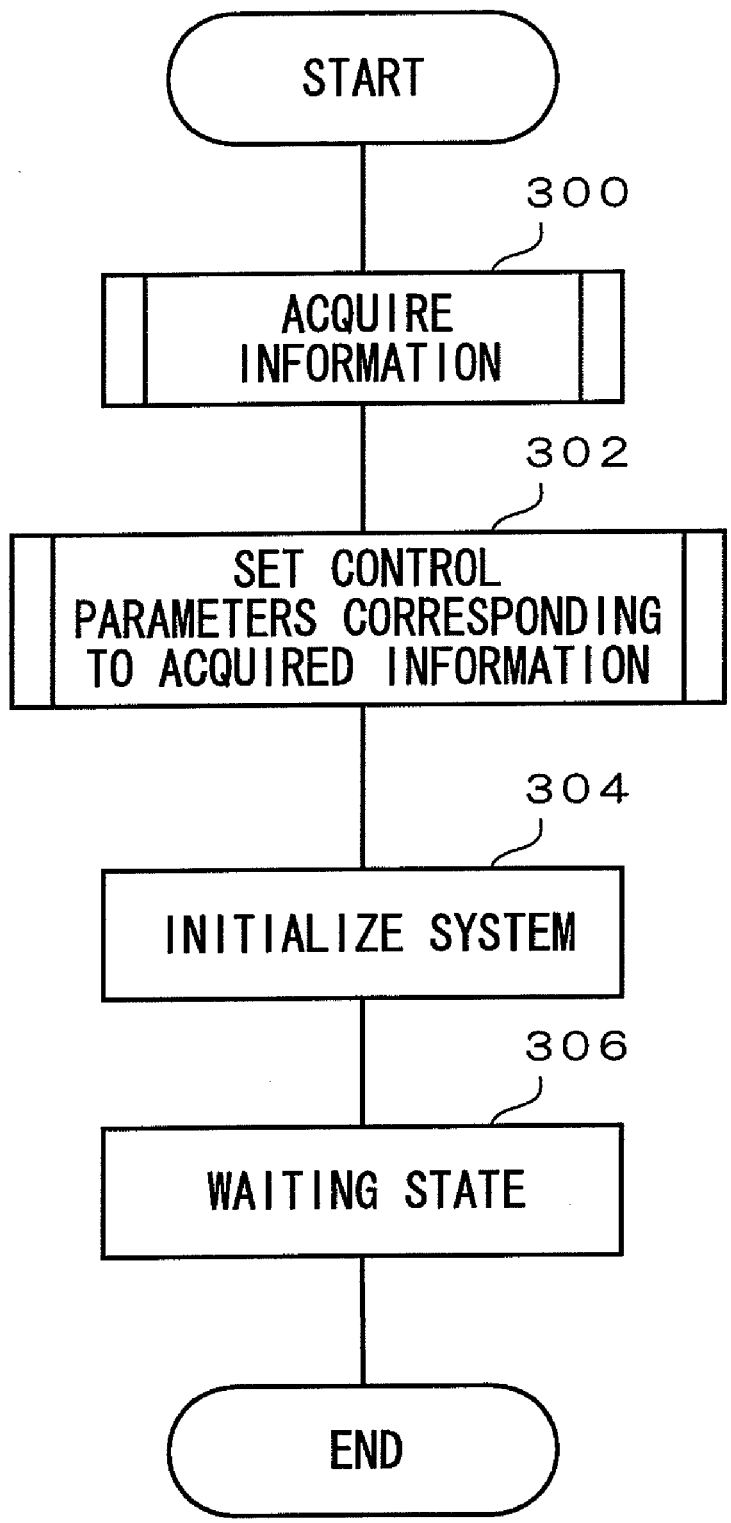
FIG. 7 is a flow chart showing a start-up processing routine in a multi-function machine according to a second exemplary embodiment of the present invention.

The flow chart in FIG. 7 shows a processing routine carried out at start-up of the multi-function machine 10. The program for the processing routine is stored in the ROM 14 of the multi-function machine 10.

At start-up of the multi-function machine 10, the processing of step 300 and step 302 is performed before the system initialization (step 304), and before arriving at the waiting state (step 306). It should be noted, however, that the processing of step 300 and step 302 may be performed after the system initialization (step 304).

Accumulation of the information for performing appropriate control of the installed HDD 30 is first carried out (step 300), and then the control parameters of the control program for the HDD 30 are set according to the information acquired (step 302).

Explanation will now be given of the information acquiring routine of step 300 and the control parameter setting routine of step 302. Explanation will be given of three patterns of different setting methods, with reference to FIGS. 8A to 10B.

Figure 8A:
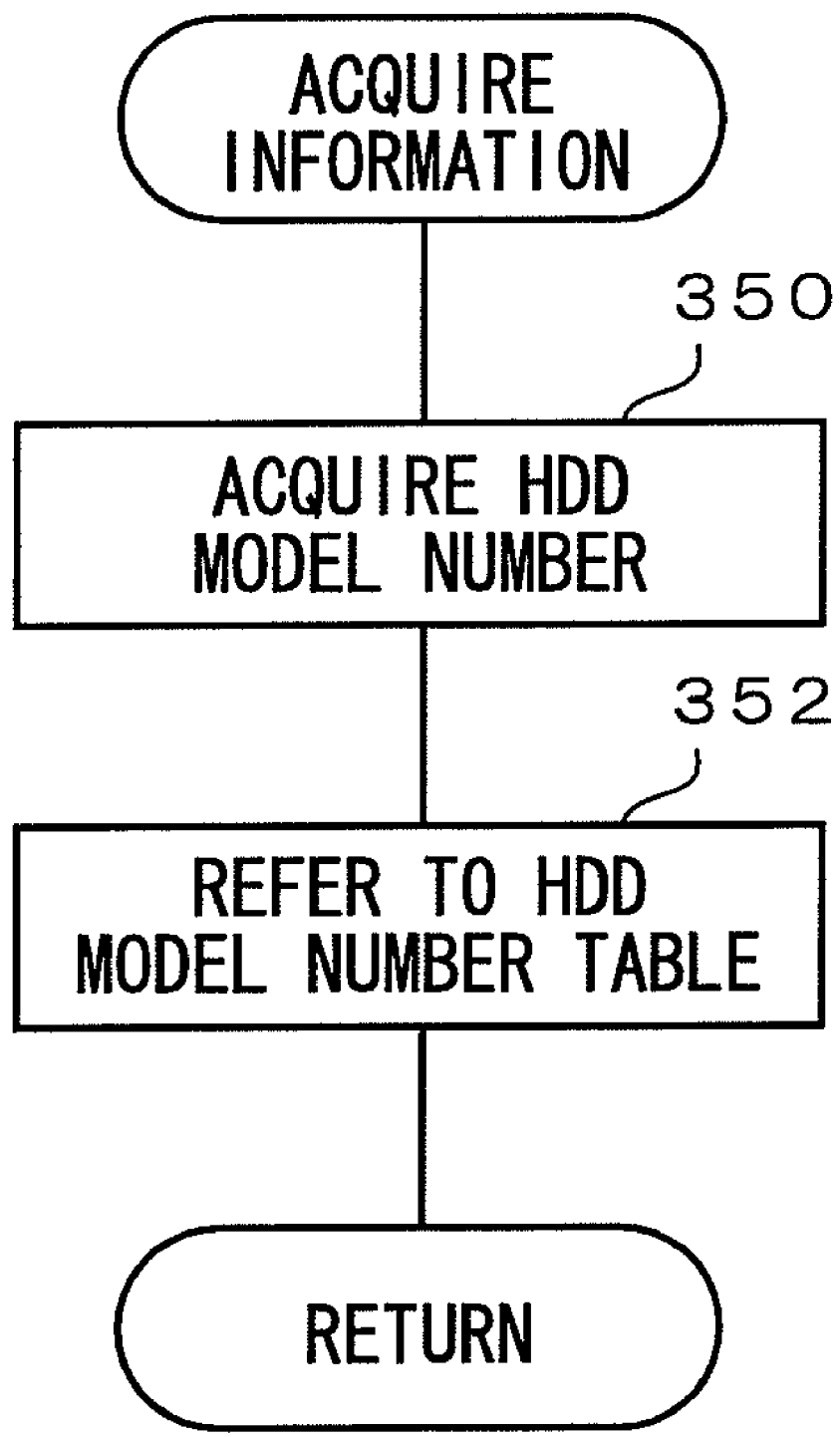
FIGS. 8A and 8B are flow charts for processing to set control parameters based on the model number of the HDD.
Figure 8B:
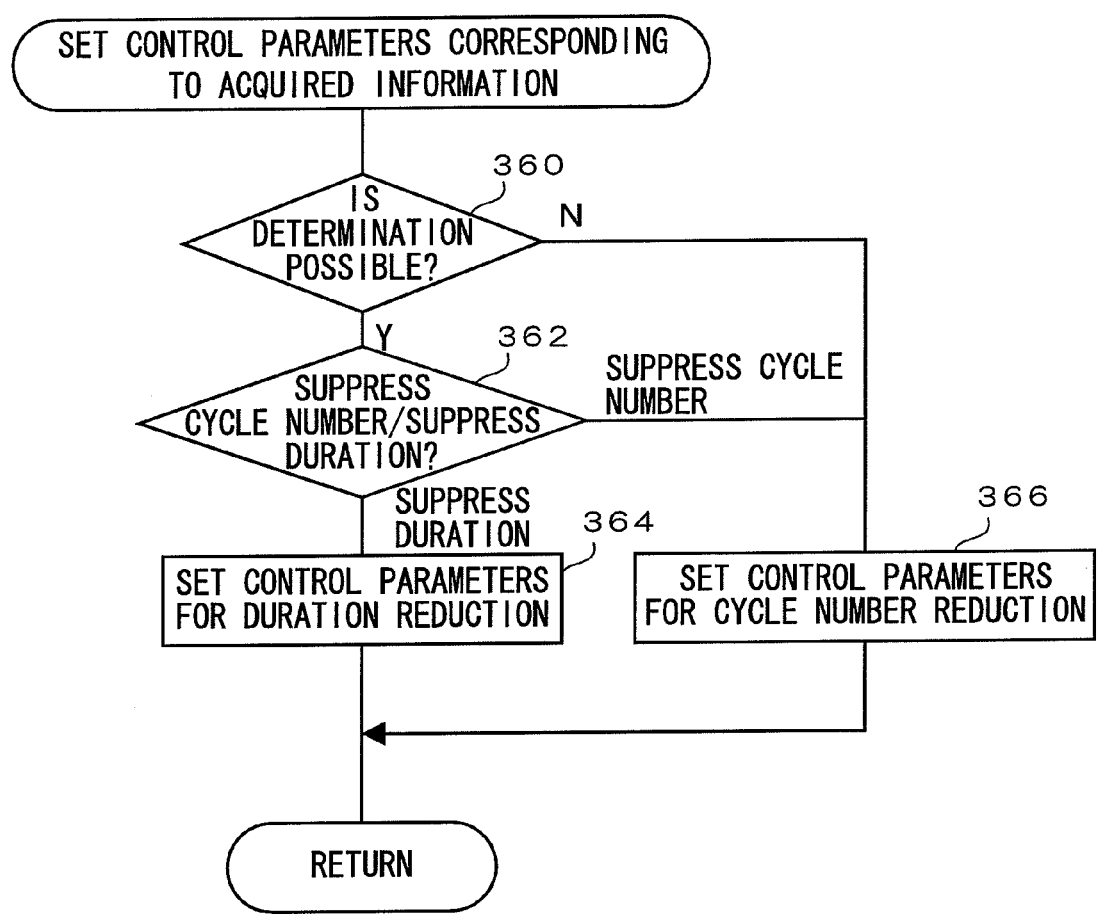

The flow charts of FIGS. 8A and 8B show control parameter setting routines based on the model number of the HDD 30.

In the flow chart of FIG. 8A, the model number of the HDD 30 is acquired by issuing a model number acquisition command at step 350.

At step 352, a HDD model number table that has been prepared in advance in the multi-function machine 10 is referred to. In the HDD model number table plural HDD model numbers and the control parameters appropriate for each of the model numbers are related to each other and stored. It should be noted that the HDD model number table is one that may be updated at a later date, and additional information and the like may be added as required.

In the flow chart of FIG. 8B, at step 360, determination is made as to whether the appropriate control parameters for the HDD 30 are capable of being determined, by whether the acquired model number of the HDD 30 is stored in the HDD model number table. If the model number is stored, then routine proceeds to step 362, and when not stored then the routine proceeds to step 366.

At step 362 it is determined if the appropriate control parameters, for the HDD stored in the HDD model number table corresponding to the model number of the acquired HDD 30, are duration reduction parameters or cycle reduction parameters. If determination is that they are duration reduction parameters then the routine proceeds to step 364, and if determination is that they are cycle reduction parameters then the routine proceeds to step 366.

At step 364, duration reduction parameters are set in the control program. Such duration reduction parameters are control parameters for controlling to reduce each of the power supply duration, the motor driving duration, and the magnetic head hovering duration.

At step 366, cycle reduction parameters are set in the control program. Such cycle reduction parameters are control parameter for controlling to reduce each of the number of cycles power supply on/power supply off, the number of cycles of motor driving/stopping driving, and the number of cycles of magnetic head load/unload. For example, number of cycles of power supply on/power supply off may be reduced by continuing power supply even when shifted into the energy saving mode, the number of cycles of motor driving/stopping driving may be reduced by preventing the motor from being stopped even when shifted into the energy saving mode, and the number of cycles magnetic head load/unload may be reduced by preventing retraction of the head even when shifted into the energy saving mode.

If the case where control to reduce the number of operation switching cycles is performed on an installed HDD for which a reduction in operation duration is actually more appropriate is compared to a case where control to reduce the operation duration is performed on an installed HDD for which a reduction in operation switching cycles is actually more appropriate, then there is a greater possibility that the lifespan of the HDD will be shortened in the later case, where control to reduce the operation duration is performed on an installed HDD for which a reduction in operation switching cycles is more appropriate. Therefore, if the model number of the HDD 30 is not stored in the HDD model number table and no determination can be made of the appropriate control parameters at step 360, then the cycle reduction parameters are applied.

Figure 9B:
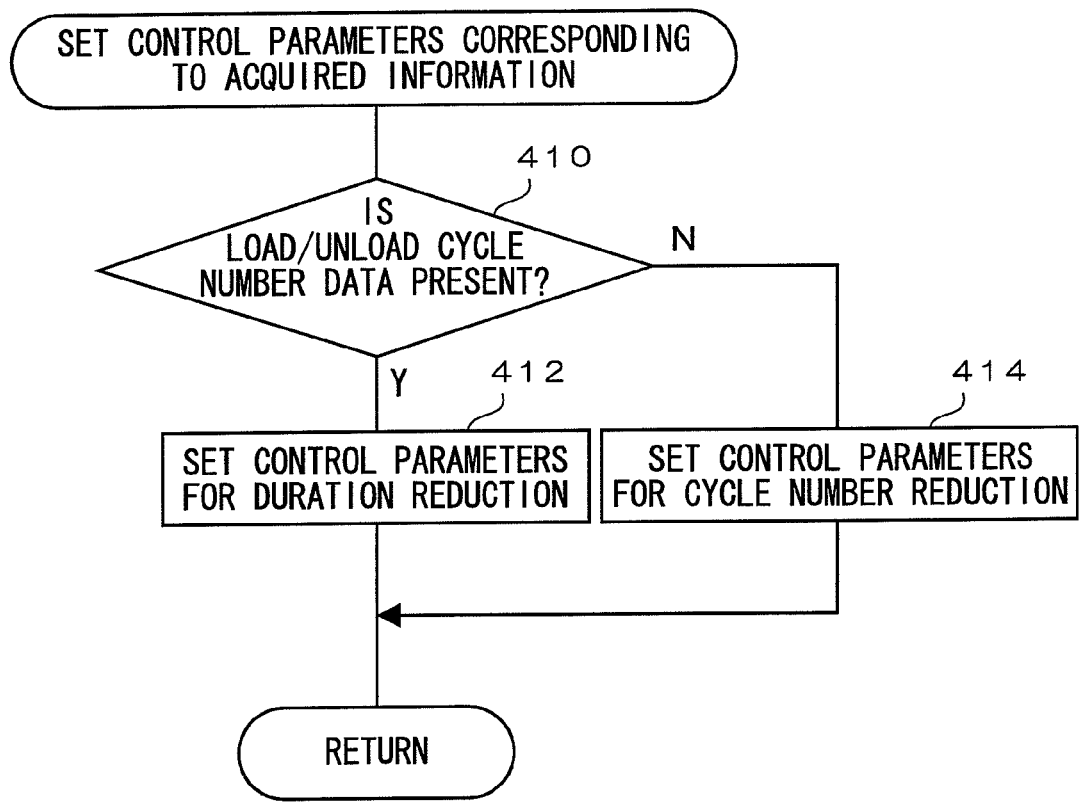

The flow charts in FIGS. 9A and 9B show routines for determining the control parameters based on SMART information.

In FIG. 9A, the SMART information is acquired in step 400 from the HDD 30.

In FIG. 9B, at step 410, determination is made as to whether there is information in the acquired SMART information about the total number of times that the magnetic heads have been retreated to a non-operation position away from the surface of the magnetic disk, and returned thereafter to the surface of the magnetic disk. If there is this information then the routine proceeds to step 412, and if not, then the routine proceeds to step 414.

At step 412 duration reduction parameters are set in the control program.

At step 414 cycle reduction parameters are set in the control program.

Figure 10A:
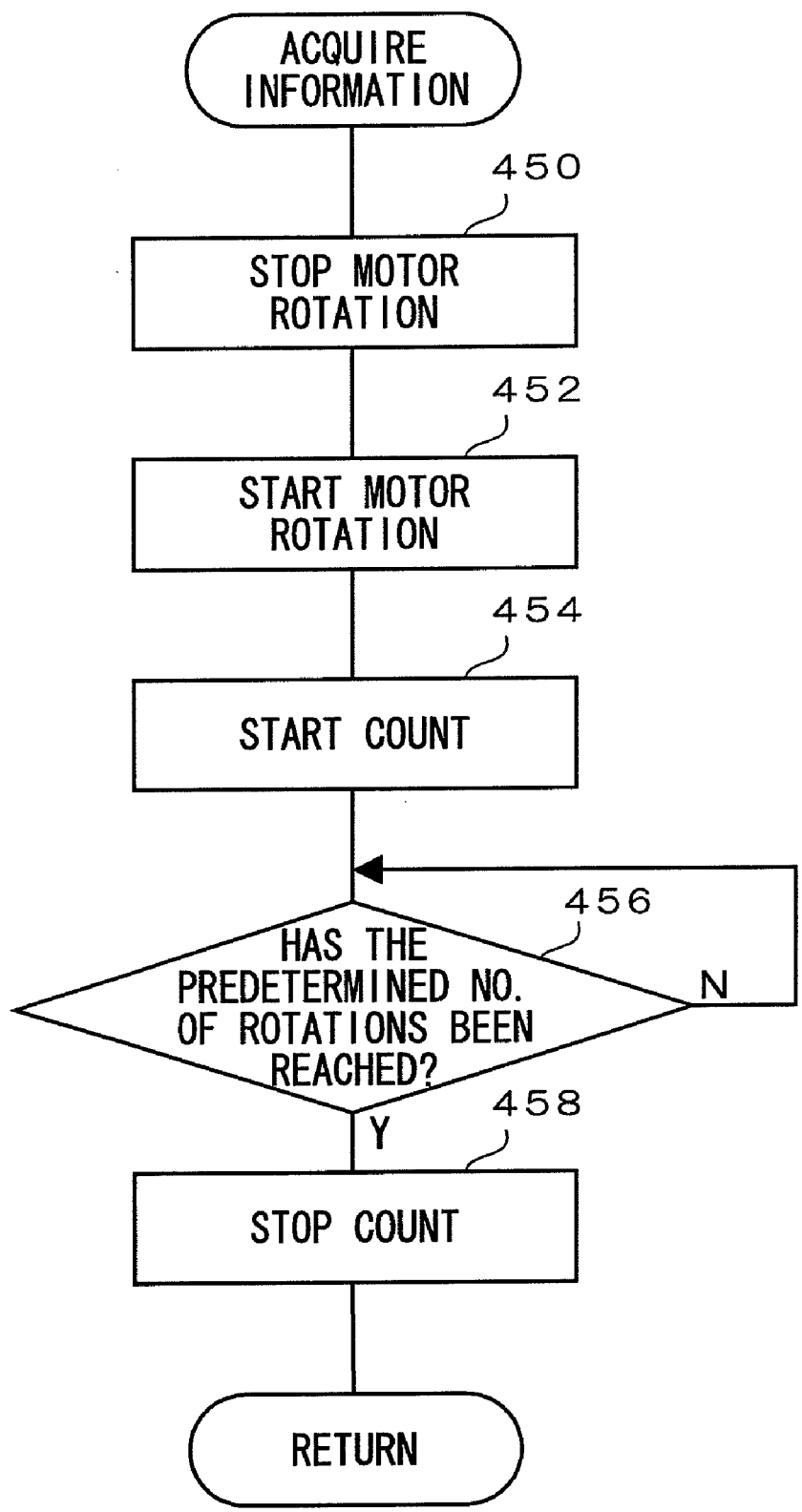
FIGS. 10A and 10B are flow charts for processing to set control parameters based on the start-up duration of a rotational drive motor.
Figure 10B:
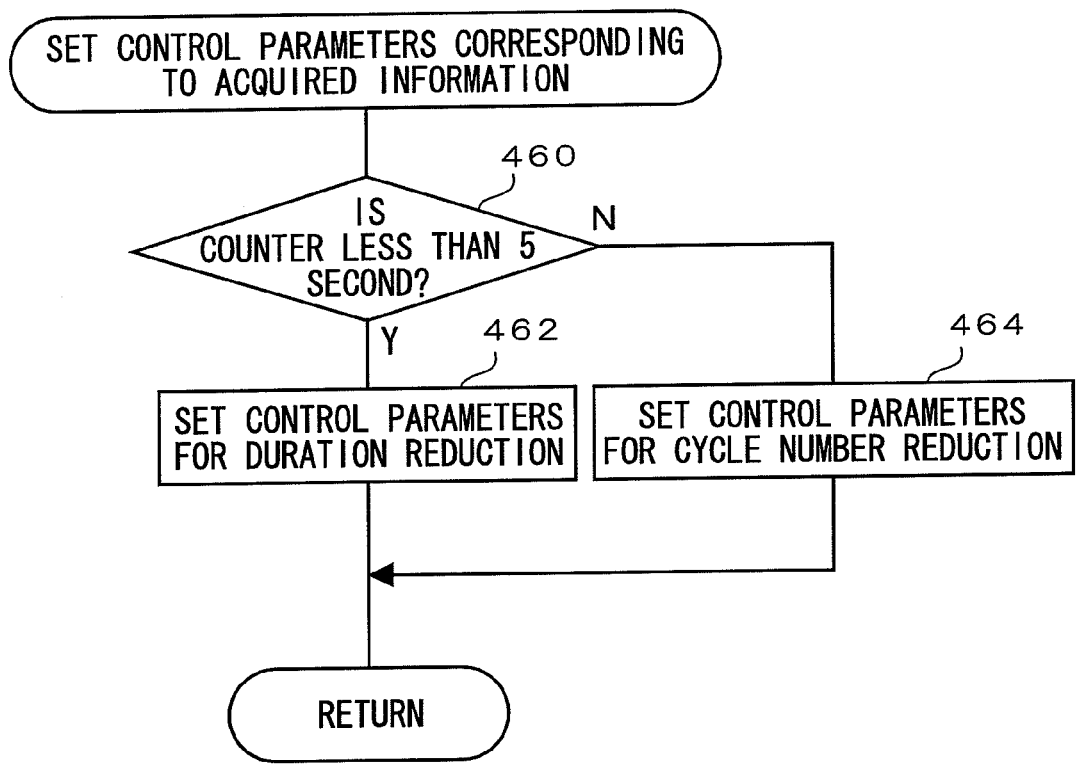

The flow charts in FIGS. 10A and 10B show routines for setting control parameters according to the rotation of the rotational drive motor 42.

In the flow chart of FIG. 10A, at step 450, if the rotational drive motor 42 is rotating then the rotation of the rotational drive motor 42 is stopped.

At step 452, the rotational drive motor 42 is rotated and the count in the counter provided in the system controller 20 is started (step 454).

At step 456, determination is made as to whether or not a predetermined number of rotations of the rotational drive motor 42 has been reached. If the predetermined number of rotations has been reached then the routine proceeds to step 458, and if not, then the determination of step 456 is carried out again.

At step 458, the count of the counter is stopped, and the start-up duration of the rotational drive motor 42 is acquired.

In the flow chart of FIG. 10B, determination is made as to whether the start-up duration of the rotational drive motor 42 that has been measured by the counter is less than 5 seconds. The start-up duration of a rotational drive motor for an HDD that is preferably controlled to reduce each of the power supply duration, the motor driving duration and the magnetic head hovering duration is usually about 3 seconds, and the start-up duration of a rotational drive motor for a HDD that is preferably controlled to reduce each of the number of cycles of power supply on/power supply off, the number of cycles of motor driving/stopping driving and the number of cycles of magnetic head load/unload is usually about 10 seconds. It is therefore based on these figures that the designation of the appropriate control parameters is made in the present exemplary embodiment at the 5 second standard time. It should be noted that the 5 second standard time may be altered later.

At step 462, the duration reduction parameters are set in the control program.

At step 464, the cycle reduction parameters are set in the control program.

In the second exemplary embodiment, control is changed in such a manner based on one or other of the HDD model number, SMART information, or the start-up duration of the rotational drive motor, and control is performed: to reduce each of the number of cycles of power supply on/power supply off, number of cycles of motor driving/stopping driving, or number of cycles of magnetic head load/unload; or to reduce each of the power supply duration, the motor driving duration and the magnetic head hovering duration.

It should be noted that while explanation has been given in the above first exemplary embodiment and second exemplary embodiment of cases where there is a shift into the energy saving mode, the present invention may also be applied to a device which does not shift into an energy saving mode.

Explanation has been given in the first exemplary embodiment of a case where: the basic control program and the control parameters according to the HDD external dimension are stored in a storage unit; the external dimension of the installed HDD is determined by the determining unit; and the changing unit changes the control parameters according to the external dimension of the HDD that it has been determined is installed and changes the main control program. Explanation has also been given in the second exemplary embodiment of a case where: the basic control program and the control parameters according to various HDD with different characteristics are stored in the storage unit; the external dimension of the installed HDD is determined by the determining unit; and the changing unit changes control using the control parameters according to the characteristics of the installed HDD and the basic control program. However, the present invention may also be practiced in the following forms.

In a third exemplary embodiment: control programs for each HDD external dimension are recorded in the storage unit; the external dimension of the installed HDD is determined by the determining unit; and the changing unit changes the control by using a control program according to the external dimension of the installed HDD.

According to the third exemplary embodiment, appropriate control may be performed of the installed HDD without combining control parameters with the basic control program.

In a fourth exemplary embodiment: control programs corresponding to various HDD characteristics are stored in the storage unit; the characteristics of the installed HDD are acquired by an acquiring unit; and the changing unit changes control by using the control program that corresponds to the characteristics of the installed HDD.

According to the fourth exemplary embodiment, appropriate control may be performed of the installed HDD without combining control parameters with a basic control program.

In a fifth exemplary embodiment: a control program set with control parameters corresponding to a predetermined external dimension and control parameters corresponding to external dimension(s) that are different to the predetermined external dimension are stored in the storage unit; the external dimension of the installed HDD is determined by the determining unit; and when the installed HDD has been determined to have a different external dimension than the predetermined external dimension, the changing unit changes control by changing the control parameters in the control program to the control parameters corresponding to those of the external dimension of the installed HDD.

According to the fifth exemplary embodiment, by setting the control program with the control parameters that correspond to the predetermined external dimension of the HDD that is frequently installed, control that is appropriate to the external dimension of the installed HDD may be performed, as well as the frequency of changes to the control parameters being suppressed to a low level.

According to a sixth exemplary embodiment, a control program set with control parameters corresponding to predetermined characteristics and control parameters corresponding to characteristics that are different to the predetermined characteristics are stored in the storage unit; the characteristics of the installed HDD are acquired by an acquiring unit; and when the characteristics that have been acquired of the installed HDD are different from those of the predetermined characteristics, the changing unit changes control by changing the control parameters in the control program to the control parameters corresponding to those of the characteristics the installed HDD.

According to the sixth exemplary embodiment, by setting the control program with the control parameters that correspond to the predetermined characteristics of the HDD that is frequently installed, control that is appropriate to the installed HDD may be performed, as well as the frequency of changes to the control parameters being suppressed to a low level.

Furthermore, in the exemplary embodiments which have been described, the functions performed by the CPU 12, ROM 14, and RAM 16 in the multi-function machine 10 of FIG. 1, and/or the functions performed by the CPU, ROM, and RAM in the HDC 54 in the HDD 30 of FIG. 2, may be realized by executing program(s) in a computer. Examples have been given where programs are stored in the ROM 14 and the like, but in such cases these programs may be supplied stored on a storage medium such as a CD ROM.

While the invention has been illustrated and described with respect to specific exemplary embodiments thereof, it is to be understood that the invention is by no means limited thereto and encompasses all changes and modifications which will become possible within the scope and spirit of the invention.

What is claimed is:

1. A hard disk drive controller comprising:
 a determining unit that determines an external dimension of a hard disk drive that is provided with a motor for rotating a hard disk and a head that is retractable from the hard disk; and
 a changing unit that changes control of the hard disk drive device according to the external dimension that has been determined by the determining unit,
 wherein, according to the external dimension, the changing unit changes control by at least one of:
 an increase-decrease in the number of cycles of power supply on-off to the hard disk drive;
 an increase-decrease in the number of times the head is retracted; and/or an increase-decrease in the rotation duration of the motor.

2. A hard disk drive controller comprising:
 a determining unit that determines an external dimension of a hard disk drive that is provided with a motor for rotating a hard disk and a head that is retractable from the hard disk; and
 a changing unit that changes control of the hard disk drive device according to the external dimension that has been determined by the determining unit, wherein, when the external dimension was not able to be determined by the determining unit, the changing unit changes control of at least one of the following:

a decrease in the number of cycles of power supply on-off to the hard disk drive;

a decrease in the number of times the head is retracted; and/or a decrease in the rotation duration of the motor.

3. An image forming apparatus comprising:

a energy saving switching unit that shifts the image forming apparatus into an energy saving mode according to pre-set conditions;

a determining unit that determines an external dimension of a hard disk drive section; and a changing unit that, when the external dimension that has been determined by the determining unit is a predetermined value or above, changes control of the hard disk drive so as to suppress the number of retraction cycles of a head within the hard disk drive.

4. The image forming apparatus according to claim 3, wherein the changing unit changes control so as to prevent retraction of the head when in the energy saving mode.

5. The image forming apparatus according to claim 3, wherein the changing unit changes control so that power is continuously supplied to the hard disk drive section when in the energy saving mode.

6. A computer readable medium storing a program causing a computer to execute a process for controlling a hard disk drive, the process comprising:

determining an external dimension of a hard disk drive that is provided with a motor for rotating a hard disk and a head that is retractable from the hard disk; and controlling the hard disk drive according to the external dimension that has been determined by the determining unit, wherein controlling the hard disk drive comprises at least one of:

changing in the number of cycles of power supply on-off to the hard disk drive according to the external dimension, changing in the number of times the head is retracted according to the external dimension, and changing in the rotation duration of the motor according to the external dimension.

7. The computer readable medium according to claim 6, wherein controlling the hard disk drive comprises at least one of when the external dimension was not able to be determined by the determining step, decreasing in the number of cycles of power supply on-off to the hard disk drive, decreasing in the number of times the head is retracted, and decreasing in the rotation duration of the motor.

8. A control method for a hard disk drive, comprising:

determining an external dimension of a hard disk drive that is provided with a motor for rotating a hard disk and a head that is retractable from the hard disk; and controlling the hard disk drive according to the external dimension that has been determined by the determining unit, wherein controlling the hard disk drive comprises at least one of:

changing in the number of cycles of power supply on-off to the hard disk drive according to the external dimension, changing in the number of times the head is retracted according to the external dimension, and changing in the rotation duration of the motor according to the external dimension.

9. A control method for a hard disk drive, comprising:

determining an external dimension of a hard disk drive that is provided with a motor for rotating a hard disk and a head that is retractable from the hard disk; and controlling the hard disk drive according to the external dimension that has been determined by the determining unit, wherein controlling the hard disk drive comprises at least one of when the external dimension was not able to be determined by the determining step, decreasing in the number of cycles of power supply on-off to the hard disk drive, decreasing in the number of times the head is retracted, and decreasing in the rotation duration of the motor.

* * * * *